Aug. 28, 1923.

C. M. CASE 1,466,612

STEERING DEVICE

Filed Aug. 22, 1921

C. M. CASE 1,466,612

STEERING DEVICE

Filed Aug. 22, 1921

Calvin M. Case INVENTOR

BY Victor J. Evans

Attorney

Aug. 28, 1923.

C. M. CASE

STEERING DEVICE

Filed Aug. 22, 1921

Calvin M. Case INVENTOR

BY *Victor J. Evans*

ATTORNEY

WITNESSES

Aug. 28, 1923.
C. M. CASE
1,466,612
STEERING DEVICE
Filed Aug. 22, 1921
4 Sheets-Sheet 4
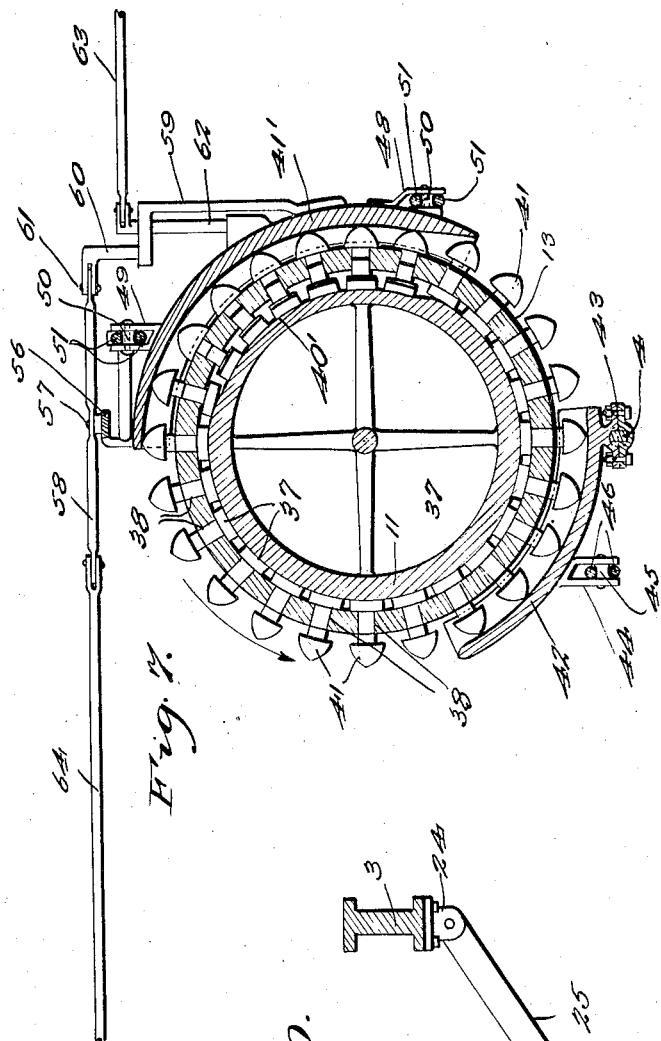
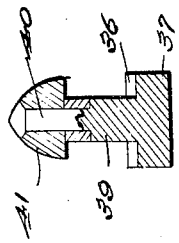
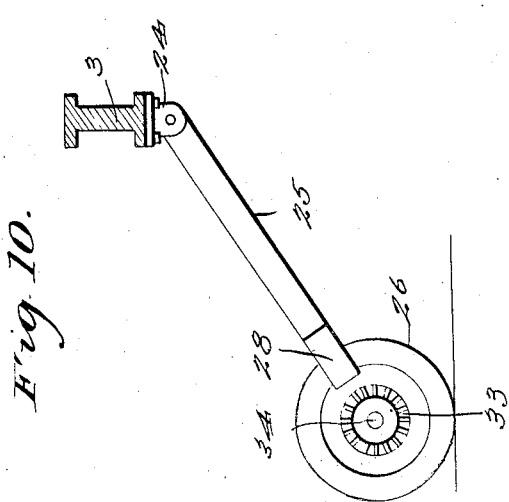
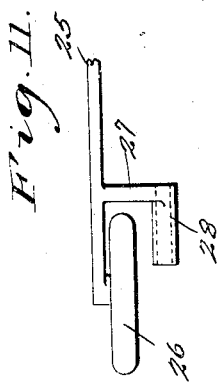
Calvin M. Case INVENTOR
BY Victor J. Evans
ATTORNEY Patented Aug. 28, 1923.

1,466,612

UNITED STATES PATENT OFFICE.

CALVIN M. CASE, OF NIAGARA FALLS, NEW YORK.

STEERING DEVICE.

Application filed August 22, 1921. Serial No. 494,425.

*To all whom it may concern:*

Be it known that I, CALVIN M. CASE, a citizen of the United States, residing at Niagara Falls, in the county of Niagara and State of New York, have invented new and useful Improvements in Steering Devices, of which the following is a specification.

My present invention has reference to steering apparatus.

My object is to produce a means whereby a train of trackless conveyances will be caused to travel in the same direction and to successively turn at the same place at which the leading and guiding conveyance turns.

A further object is to provide trackless conveyances, such as a train of motors, cars, vessels, etc., with steering apparatus of a construction that shall be locked when the conveyances pursue a straight course, so that side swaying therebetween will be prevented and which is also of a construction whereby the locking means is released when each conveyance reaches a point at which the preceding conveyance has made a turn to actuate means for likewise causing the turning of each conveyance at the precise point at which the preceding conveyance has turned.

To the attainment of the foregoing and other objects which will present themselves as the nature of the invention is better understood, reference is to be had to the accompanying drawings in which there is illustrated a satisfactory embodiment of the improvement reduced to practice, and wherein:—

Figure 5 is a sectional view approximately on the line 5—5 of Figure 4.

Figure 6 is a greatly enlarged sectional view through the drum and core, the laterally movable blocks being in elevation.

Figure 7 is a greatly enlarged sectional view approximately on the line 7—7 of Figure 3.

Figure 8 is a perspective view of one of the slidable blocks.

Figure 9 is an approximately central, vertical, transverse, sectional view through the construction disclosed in Figure 8.

Figure 10 is a side elevation of the drum actuating wheel illustrating its connection with the front axle of a truck.

Figure 11 is a fragmentary top plan view of the mounting for the operating wheel.

Figure 1:
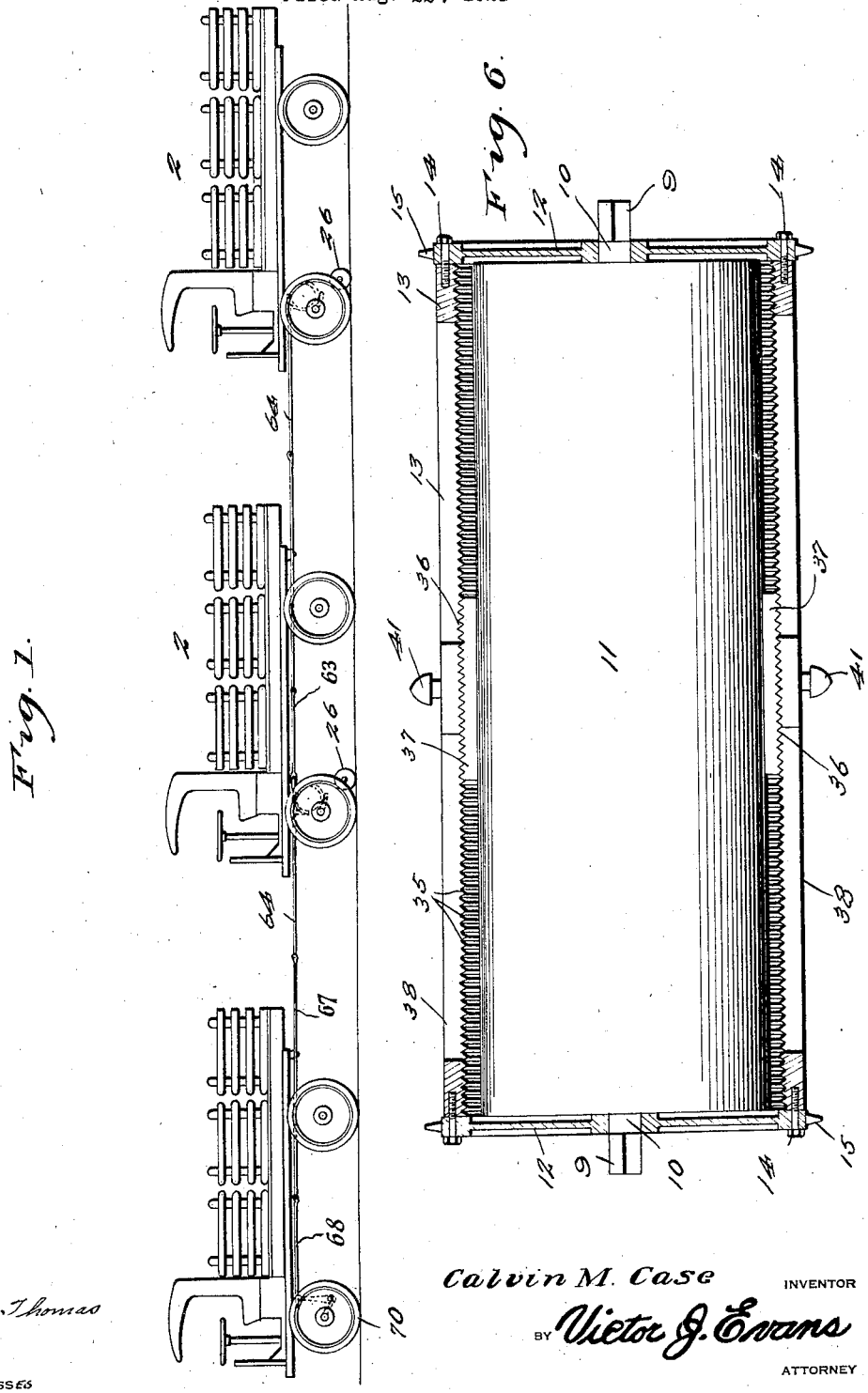
Figure 1 is a side elevation of a train of trucks provided with steering apparatus in accordance with this invention.
Figure 2:
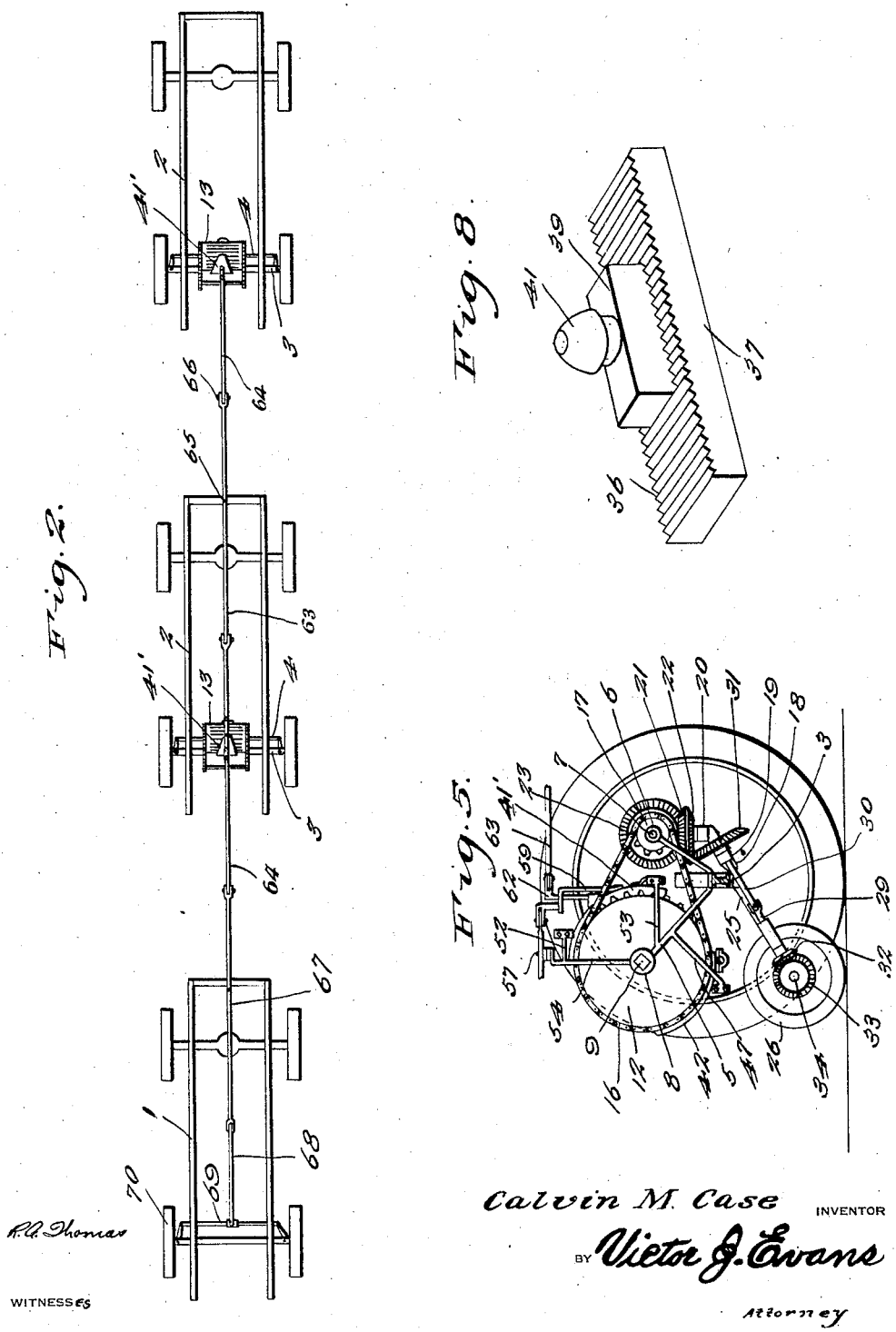
Figure 2 is a top plan view thereof.

While in the drawings I have illustrated my steering apparatus in connection with a train of trucks, it is to be understood that the device is not to be limited to such application, as the same may be employed with equal efficiency on other trackless conveyances, either land or water craft.

Referring now to the drawings in detail, the numeral 1 designates the forward or lead truck, and the numeral 2 designates the follower or remaining trucks of the train. Preferably the operating means for the trucks 2 are controlled from the truck 1, so that any desired number of trucks 2 may be hitched together and to the truck 1, and the operator for all of the trucks being seated in the truck 1.

For distinction, the front axle of each truck 2 is indicated by the numeral 3, and the connecting rod for the steering knuckles for the truck wheels, by the numeral 4. The axle 3 of each truck 2 supports thereon spaced frames, each of a similar construction, and each broadly indicated by the numeral 5. The body of each frame is substantially V-shaped, and the forwardly projecting angle arms thereof have their ends formed with bearings 6 for a shaft 7. The opposite angle arms of the frames are formed with annular bosses 8 provided with squared bores for the reception of the squared ends 9 of trunnions 10 provided upon the ends of a cylindrical member which I will hereinafter, for the sake of convenience, refer to as the core of the improvement. The core is indicated by the numeral 11. Journaled on the rounded inner portions of the trunnions are the wheel ends 12 of a cylindrical drum 13, the said drum, of course, surrounding the core, but being spaced therefrom. The wheels 12, constituting the ends of the tubular drum 13 are preferably bolted to the drum, as indicated by the numeral 14 and the said wheels have peripheral teeth 15 around which there are trained sprocket chains 16 that are likewise trained around similar sprocket wheels 17 on the shaft 7. It will thus be noted that when the shaft 6 is revolved, the drum 13 will be likewise turned.

Secured to the axle 3, at the center thereof there is a bracket 18 disposed at an upward angle and having an offset bearing 19 and an upwardly directed end 20. On the end 20 of the bracket there is a wheel that has both its upper and lower faces beveled inwardly from its periphery to provide upper teeth 21 and lower teeth 22. Keyed on the shaft 7 there is a beveled toothed wheel 23 in mesh with the teeth 21 of the double beveled wheel.

Pivotally secured on the underface of the axle there is the arm 25 constituting an element of the mount 4, the ground contacting operating wheel 26. By reference to Figure 11 of the drawings, it will be seen that the wheel 26 has its shaft journaled through a lug at the lower end of the arm 25, and also that the said arm is provided with a lateral extension 27 having at its end a right angularly disposed tubular portion 28. The tubular portion 28 provides a bearing for a shaft section 29, the second section of the shaft, indicated by the numeral 30 being connected to the section 29 by a universal joint and being journaled in the bearing 19 of the bracket. The outer end of the shaft 30 has secured thereon a beveled toothed wheel 31 that is in mesh with the beveled toothed surface 22 of the double beveled wheel.

The shaft section 29 projects a suitable distance through the bearing 28 and has secured on its end a pinion 32 which is in mesh with a gear 33 keyed on the shaft 34 for the power imparting wheel 26.

From a construction as above described it will be seen that when the train is in motion the wheels 26 will operate to turn the drums 13 in the direction of the arrow illustrated in Figure 7.

The bore of the drum 13 has an annular series of teeth 35 arranged the entire length thereof. These teeth are designed to be engaged by similar teeth 36 provided upon the outer faces of slidable blocks 37. The inner faces of the blocks rest directly on the core 11. The drum 13 has equi-distantly spaced longitudinally arranged slots 38 which extend almost the length of the drum. Each block 37 has a centrally disposed lug 39 on the toothed face 36 thereof, the said lugs being received in the respective slots 38 of the drum 13. On each lug 39 there is a shaft extension 40, and journaled on each of said shafts there is a conoid 41. The short shafts 40 are formed with conical heads to conform to the shape of the pointed ends of the conoids, but not to interfere with the free turning of the conoids on said shafts.

The core 11 has a peripheral depression extending the entire length thereof and whose wall is indicated by the numeral 40', The depression is arranged transversely approximately one-third of the circumference of the core and is of a depth whereby the blocks resting on the wall 40' will be brought out of engagement with the teeth 35 of the drum 13, in a manner and for a purpose which will presently be apparent. The element which I shall term the distributor for the conoids is indicated by the numeral 41', the same comprising a concaved element which is disposed directly opposite the depression in the core.

The concaved receiving element for the conoids is disposed diametrically opposite the distributing member 41', and is indicated by the numeral 42. The receiving member 42 is connected by suitable clamping means 43 to the steering knuckle connecting rod 4 of the truck 2 and is also provided with a depending U-shaped bracket 44 having a roller 45 journaled therein which is engaged by spaced bearing rods 46 supported from depending angle arms 47 on the frame members 5. By reference to the drawings, it will be noted that both the distributor and the receiver are substantially V-shaped in plan, and that the reduced outlet end of the distributor is disposed opposite the widened receiving mouth of the receiver.

On the outer face of the distributor 41', adjacent to the ends thereof there are substantially U-shaped brackets 48 and 49, and between the arms of each bracket there is journaled a grooved roller 50, the opposite faces of each roller being in contacting engagement with spaced rods 51 respectively that are secured on upper and lower horizontal extensions 52 and 53 on the frame members 5. The vertical arms of the frame members 5, on which the horizontal arms 52 are formed, are indicated for distinction by the numeral 54, the opposed arms 54 being connected at their upper ends by a plate 56, or if desired the plate may be formed integrally with the members 5. On the member 56 there is centrally pivoted, as at 57, a link 58.

On the outer face of the distributor 41' there is an upstanding arm 59 having an angle end carrying an L-shaped extension 60, the horizontal arm of which being bifurcated, receiving therein one of the reduced ends of the link 58, the said end being pivoted thereto, as at 61. Also on the outer face of the distributor 41' there is a second upstanding arm 62 having its upper end provided with an offset and bifurcated extension receiving therein and having pivoted thereto the reduced end of a rod 63. The second reduced end of the link 58 is received in the bifurcated end and pivotally connected with a rod 64. The rods 63 and 64 are of equal lengths, and the rod 63 on one of the trucks 2 is centrally pivoted, as at 65 to the rear transverse bar of the truck frame. The outer or free end of the said bar 63 has a knuckle connection 66 with the end of the rod 64 of the adjacent truck 2. The rod 63, on the rear truck is of a length equalling the distance between the pivot 65 and the knuckle connection 66, and the knuckle connection is such as to permit a vertical movement between the connected rods.

The rod, indicated for distinction by the numeral 67, which is pivoted to the rear of the frame of the truck 1 has a knuckle connection with a rod 68 that is fixedly secured on the spindle or knuckle connecting rod 69 for the steering wheels 70 of the said truck 1.

Figure 3:
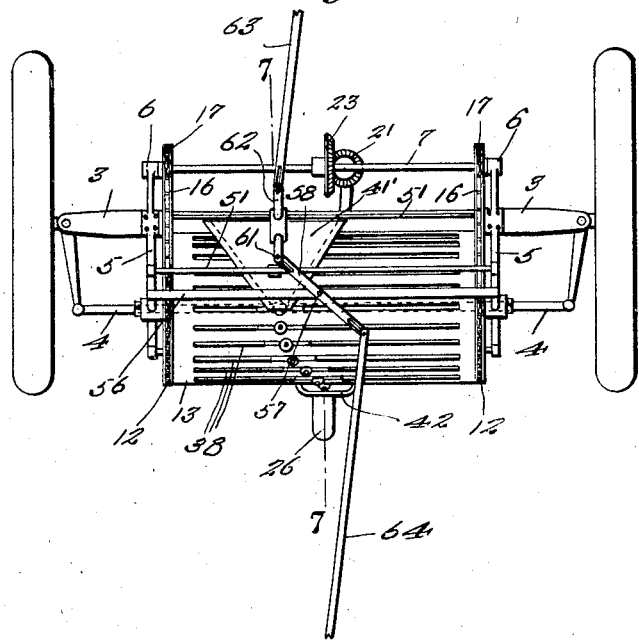
Figure 3 is a top plan view of the front wheels of one of the trucks illustrating the application of the improvement thereon.
Figure 4:
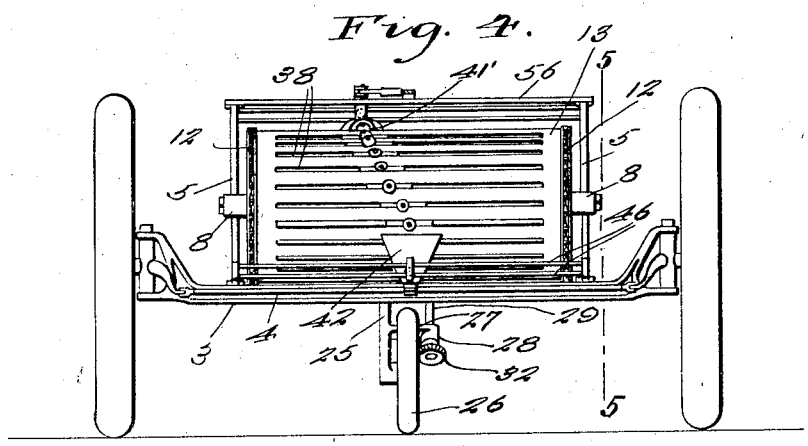
Figure 4 is a front elevation of the device as illustrated in Figure 3.

It is to be understood that the wheel base of all of the trucks are equi-distantly spaced from each other so that the drums will make approximately one-half of a revolution in a determined distance of travel of the trucks. In Figures 3 and 4 of the drawings, the rods 63 and 64 of two of the trucks 2 are disposed at angles and the link 58 is swung. When so positioned the forward truck is turning or making a curve. All of the conoids, except those received in the depression and resting on the wall 40' of the core are in locked engagement with the teeth of the drum. The last mentioned conoids are in contacting engagement with the inner concaved wall of the distributor, and it will thus be noted that a swinging of the rod 64 incident to the turning of the forward truck 1 will swing the rod 63 connected to the next truck 2 to slide the distributor to arrange the conoids therein in a position to be delivered therefrom at a determined point with respect to the revolving drum. The conoids after leaving the distributor are again locked to the drum and are in a position to be received in the widened mouth of the receiver 42. The conoids, when arranged in the receiver will be moved against one of the angle walls thereof, thus imparting a lateral movement to the receiver to cause the same to impart a like motion to the steering knuckle connecting rod 4 of the said truck 2, causing the wheels of the said truck to assume the same angle at the same spot on which the wheels of the truck 1 assumed a like angle. In a similar manner, the movement of the distributor on the truck 2 next to the truck 1 will cause the swinging of the rod 63 to break the joint between this rod and the rod 64 connected with the receiver of the next truck 2, to cause the swinging of the link 58 to move the distributor of the last mentioned truck to properly position the conoids therein and allow the same to be delivered therefrom locked to the drum in positions when received in the receiver 42 of the last mentioned truck to cause the sliding of the said receiver and the lateral movement of the steering knuckle connecting rod 69, with the result that the last mentioned truck turns in the same direction and at the same point of turning as that of the preceding truck.

It is thought that the foregoing description, when taken in connection with the drawings will fully set forth the construction and operation of the improvement to those skilled in the art to which this invention relates. The device is of a comparatively simple construction and as previously stated, only the driver of the front truck or conveyance is required in properly steering a train of trucks or conveyances. The construction herein described and illustrated discloses a satisfactory embodiment of the improvement, but the nature of the invention is such as to render the same susceptible to various changes and modifications, and therefore it is to be understood that I hold myself entitled to make all such changes which fall within the scope of the invention as defined by the appended claims.

Having described the invention, I claim:—

1. The combination with a train of vehicles, of means connecting the same and susceptible to swinging in a lateral direction only, means on all of the vehicles, except the leading vehicle for locking the connecting means when the vehicles pursue a straight course, means for successively releasing said locking means when the first vehicle takes an angular course, means connected with the steering apparatus of all except the first vehicle, and means actuated by the releasing means for engaging and imparting a lateral movement to the last mentioned means to cause the vehicles to successively assume the same angular course of the preceding vehicles and at the same place in which said vehicles have taken such course.

2. The combination with a train of vehicles, of means connecting the same and susceptible to swinging in a lateral direction only, means on all of the vehicles, except the leading vehicle for locking the connecting means when the vehicles pursue a straight course, means for successively releasing said locking means when the first vehicle takes an angular course, means connected with the steering apparatus of all except the first vehicle, said locking means including revoluble means and slidable means projecting therethrough, and means actuated by the releasing means for positioning the slidable means in locking engagement with the revoluble means for contacting engagement with the means connected with the steering apparatus to laterally influence the same to cause all of the vehicles to take the same angle course at the same place in which such course is taken by the preceding vehicle.

3. The combination with a train of vehicles, of means connecting the same susceptible to lateral swinging, means on all except the lead vehicle revoluble therewith, slidable means associated with said revoluble means projecting therethrough, means for locking certain of said slidable means to the revoluble means, means connected with the operating means for contacting with and releasing the slidable means, means disposed diametrically opposite the last mentioned means for receiving the locked slidable means, said last mentioned means connected with the steering apparatus of the vehicles for actuating the same when contacted by the slidable means, when the latter is disposed in one position on the revoluble means incident to the aligning arrangement thereof by the releasing means when the latter has been moved by the connecting means for the vehicles and whereby all of the vehicles are caused to take the same angle course at the same place such course has been taken by the preceding vehicle.

4. The combination with a train of vehicles having the same wheel base and being equi-distantly spaced apart, of means connecting and steering the vehicles, said means including pivotally connected rods breakable in a lateral direction only, one of said rods being connected with the steering apparatus of the lead vehicle, revoluble means on the remaining vehicles, ground contacting means for imparting motion thereto, members susceptible to movement projecting through the rotary means, means in the rotary means contacting the members for holding certain of the same in locked position therewith, a distributor having angle sides connected with and designed for lateral movement by the breaking of the joints of the connecting rods for holding the slidable members in one position when the vehicles travel in a straight course and for moving the members to arrange the same in another position on the revoluble means when the vehicles take an angular course, means connected with the steering apparatus of said vehicles for receiving said slidable means when in locked position and designed to be contacted thereby to influence the steering apparatus to cause each vehicle to assume the same angular course as the preceding vehicle at the same place in which such course was taken by said preceding vehicle.

5. The combination with a train of vehicles, of means connecting the same, including breakable rods centrally pivoted to each vehicle, and a connecting rod between the steering apparatus and the rod of the lead vehicle, centrally pivoted links connecting the outer ends of the remaining rods, supporting means therefor carried by the trail vehicles, a fixed core having a depressed periphery on said supporting means, a slotted drum surrounding the core, ground contacting means for imparting motion to the drum when the vehicles are in motion, blocks resting on the core and having lugs projecting through the slots in the drum, conoids trunnioned on the outer ends of the lugs, means between the blocks and drum for locking the same thereto except such blocks as are received in the depression of the core, a concaved distributor for the conoids for lateral movement on the support, pivotally connected with the link and with the connecting rod of the next vehicle, said distributor having angle sides designed to contact with the conoids to force the same in the depression of the core, a receiver for the conoids slidable on the support and connected to the steering apparatus of the vehicle comprising a member having angle sides which are designed to be contacted by the conoids to impart a lateral movement thereto and to the steering apparatus when the connecting rods influence the links to laterally move the distributor to arrange the conoids at certain positions on the drum in accordance with the direction of travel assumed by the preceding vehicles and whereby all of the vehicles will be caused to take the same angular course at the same place at which such course was taken by the preceding vehicles.

Signed at Niagara Falls, N. Y., in the county of Niagara, State of New York, this 20th day of August, 1921.

CALVIN M. CASE